April 30, 1968 P. R. ADAMS ETAL 3,380,568

ONE-TWO DIMENSION CONVERTER CONTROL CIRCUIT FOR ERROR CORRECTING TYPEWRITER

Filed Jan. 7, 1966 3 Sheets-Sheet 1

INVENTORS
P. R. ADAMS, J. W. WHITESEL
BY
ATTORNEY

April 30, 1968 P. R. ADAMS ETAL 3,380,568

ONE-TWO DIMENSION CONVERTER CONTROL CIRCUIT FOR ERROR CORRECTING TYPEWRITER

Filed Jan. 7, 1966 3 Sheets-Sheet 3

United States Patent Office 3,380,568

Patented Apr. 30, 1968

3,380,568
ONE-TWO DIMENSION CONVERTER CONTROL CIRCUIT FOR ERROR CORRECTING TYPEWRITER

Paul R. Adams, Upper Montclair, N.J., and James Warren Whitesel, Western Springs, Ill., assignors to International Telephone and Telegraph Corporation Filed Jan. 7, 1966, Ser. No. 532,020
27 Claims. (Cl. 197—20)

ABSTRACT OF THE DISCLOSURE

The invention coordinates the two dimensional address of the place where a type bar strikes a sheet of paper in a typewriter with the one dimensional address of the place where a corresponding character is perforated on a tape. This way, the typewriter and tape may follow each other—regardless of how the typewriter platen is moved or rolled. Correction means allows a typist to move the paper in a typewriter to any spot which she may select and there type a correction with a corresponding correction on the perforated tape. This way, the corrected tape may be fed through a typewriter to provide a corrected clean copy without requiring the typist to retype the original copy.

This invention relates to machine control circuit and more particularly to circuits for converting between one- and two-dimension addresses.

Conventional typewriters are devices for preparing a printed record on a sheet of paper. Every space on the typewritten paper can be identified by a two-dimensional address. Thus, for example, a character may occupy a space which is ten lines down (Y direction) from the top of the page and ten spaces in (X direction) from the edge of the paper. As long as the sheet of paper remains in its original position in the typewriter, the typewriter may be returned to the spot on the typing paper having the address $X=10$, $Y=10$, in the example here given.

Conventionally, a perforated tape (or the equivalent) may be used to record a typewriter's operation as it occurs. If the perforated tape is thereafter fed through a read out typewriter, it will automatically print out a clean copy of the paper as originally typed. The tape is, however, a one-dimension record. If it should be necessary to make an editorial change in the material stored on the perforated tape, the address of the change would be in terms of the number of steps taken along the tape.

A person wanting to make a correction on a one-dimensional tape record would very likely be observing the need for such a correction on a two-dimensional sheet of paper. Hence, the equipment used to make an editorial correction on a reel of tape would require a device for converting the two-dimension address of a spot on a sheet of typing paper into the one-dimension address on the reel of tape, and vice versa.

Accordingly, an object of the invention is to provide new and improved control circuits for converting between one- and two-dimension addresses. In this connection, an object is to provide means for automatically making insertions, deletions, and substitutions in a one-dimension tape record responsive to a read out of the two-dimensional address on a sheet of paper.

In accordance with one aspect of the invention, these and other objects are accomplished by means of a control circuit utilizing dual recording media, such as two reels of perforated tape, for example. Data is stored on a first of the dual media tapes while an original copy is being typed on a sheet of typing paper. Whenever it is necessary to make a correction, a control function is performed at the typewriter and corrected copy is stored on the second of the dual media tapes while the correction is being typed on the typing paper or a substitute therefor. During read out of the tape, the reading head is adapted to switch back and forth between the first and second media tapes. This way, the read out of the dual media may be used to provide a single clean copy tape which is a collated amendment including both the information stored on the original record tape and the editorial corrections stored on the second tape. In addition, the converter preserves a running memory of the position of the two dimensional typewritten copy and the one dimensional perforated tape so that corrections may be made at appropriate spots on the tape responsive to the two dimensional line and space address of the corresponding spot on the typed copy.

In the appended claims, it will be convenient to refer to the natural "interruption points" which occur in virtually all typed copy. These are the points (such as carriage return, line feed, tabulate, and the like) where a typewriter must stop naturally and thus provide an opportunity for the machine to make a decision as to whether a correction is or is not required. Certain prior art typewriters have been adapted to proceed to these natural interruption points and there to decide whether to typeout responsive to signals stored in one medium or responsive to signals stored in another medium.

As will become more apparent, the invention is not limited to a decision-making machine which must stop at these or any other interruption points. Instead, the typewriter may make changes at any character location in an original text, irrespective of the nature of previously typed copy.

This inventive technique provides a distinct advantage since the typewriter "thinks" as a typist thinks. That is, she is used to making a pen and ink correction by inserting a caret and writing a change in between the lines wherever a correction is required. If the inventive typewriter does this essentially the way a typist does it, she requires no particular training to use the typewriter. Moreover, the typewriter is much less expensive since it no longer needs the same high degree of decision-making equipment.

The above mentioned and other features of this invention and the manner of obtaining them will become more apparent, and the invention itself will be best understood by reference to the following description of an embodiment of the invention taken in conjunction with the accompanying drawings, in which.

Figure 1:
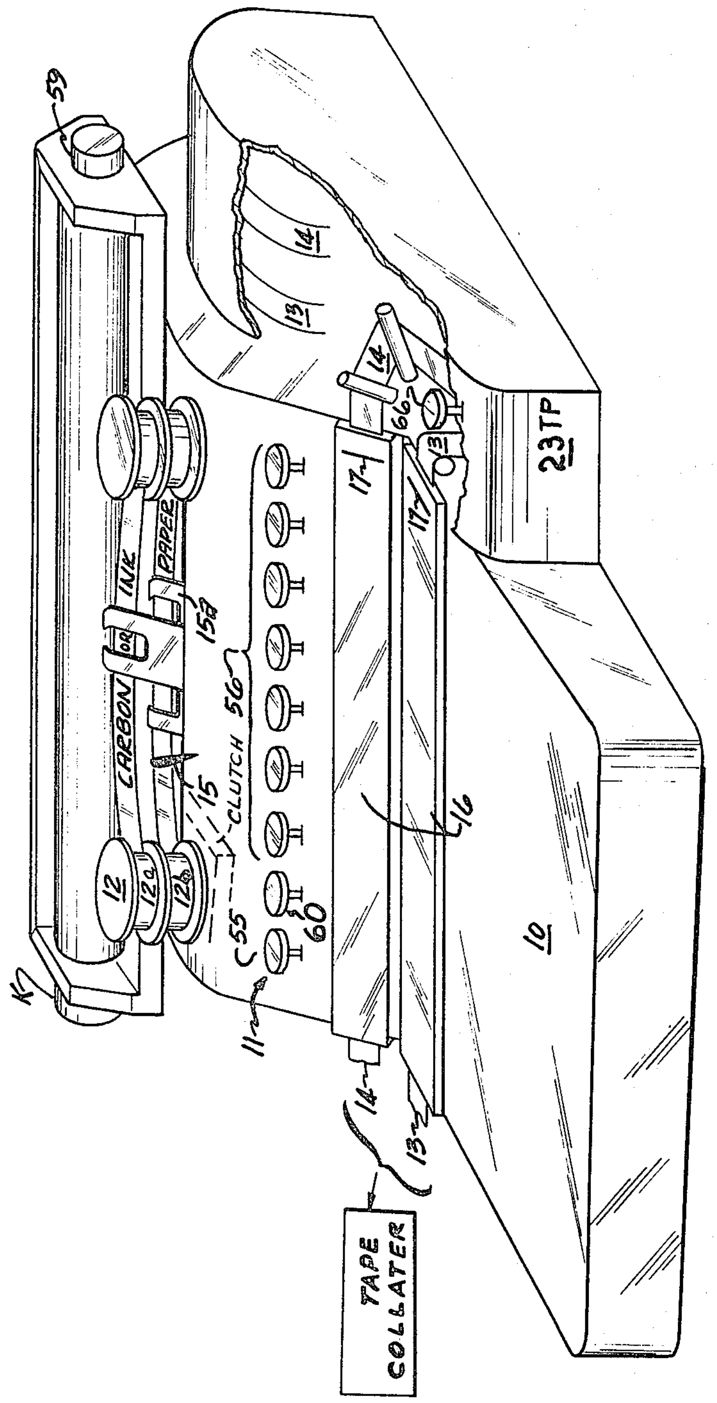
FIG. 1 shows an automatic typewriter having the capability of performing the desired editorializing functions.

FIG. 1 shows a typewriter of any conventional design with a standard keyboard 10, extra keys 11, and a double-decked spool arrangement 12. The upper spool **12*a* carries an ink ribbon, and the lower spool 12*b*** carries a paper ribbon or tape. A primary or original record, first data storage medium, is here shown as a perforated tape 13. A correction record, second data storage medium, is here shown as another perforated tape 14.

The typewriter may take any suitable form; however, the invention contemplates a use of a high quality electric typewriter such as those used in modern business offices. The typewriter may have any suitable type face means—such as type bars, a type ball or the like. Thus, the terms "type bar" or "type face means" are used herein with generic significance.

The double-deck ink and paper tape spool 12 is geared to take one full step for every character that is typed, as is conventionally done with carbon ribbon. On other types of typewriters using silk ribbons, which do not take such a full step, there should be a gearing between the ink and paper spools (12*a*, 12*b* respectively) so that the tape on the paper spool takes the same full step per typed character although the ink ribbon takes a step which is less than a full character.

The paper tape spool 12*b* is coupled to its drive via a clutch-like device (here shown by a hollow dashed line box CL) so that the paper tape either may remain motionless while the ink ribbon steps, on may step with the ink ribbon, depending upon a control exercised by the typist. Normally, the paper tape spool 12*b* is declutched and held stationary below the ink ribbon spool 12*a*. When it is necessary to type a correction, the paper tape may be selectively elevated by a control switch 15 which raises a tape guide 15*a* to the position which is struck by a type bar. When guide 15*a* is in position, the clutch for the paper spool drive is engaged to pull the paper tape as the correction is typed. This way the paper tape receives the original impression of the type bars when corrections are made.

Figure 3:
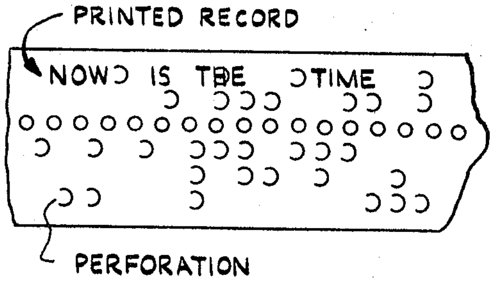
FIG. 3 shows a torn section of tape and is useful for explaining the invention.

The typewriter has two perforating machines 23 for making the original and correction record tapes 13 and 14, respectively. Preferably, each tape is a conventional chadless tape (FIG. 3) which carries both a printed record and a perforated record, prepared in a well known manner. The original record, perforated tape 13 runs across the typewriter (FIG. 1) above and slightly behind the normal keyboard 10. The correction record perforated tape 14 also runs across the typewriter behind the keyboard and adjacent the original record perforated tape. Where the tape crosses the keyboard, it is covered by a transparent plate 16 to facilitate an easy visual comparison between the original typed document and information written on the tape. Index means, preferably in the form of a hair line 17, appears on each plate 16 to identify the symbol on the tape corresponding to the character last struck by the type bar.

Figure 2:
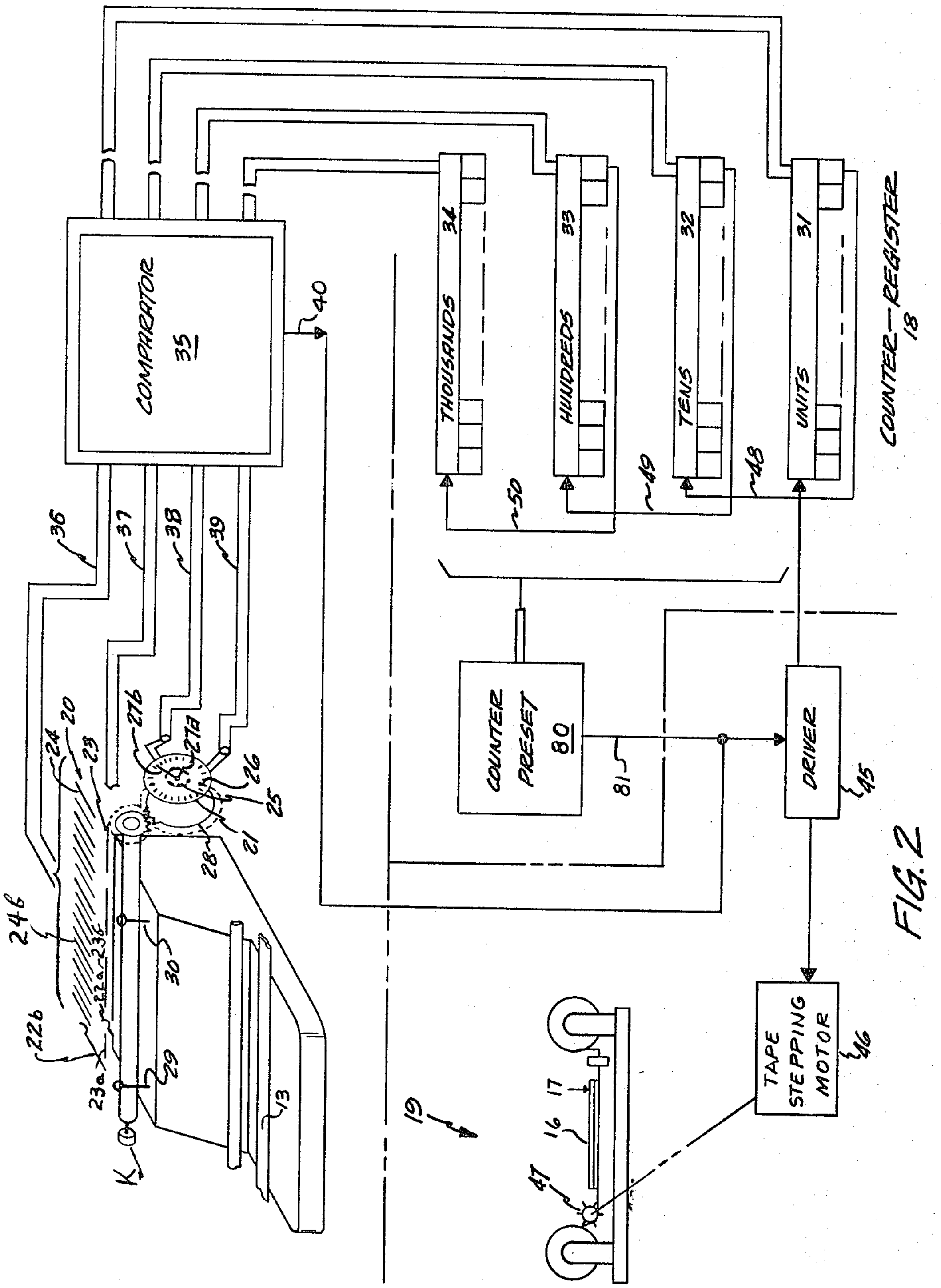
FIG. 2 shows a one-dimension–two-dimension converter control circuit for relating the position of the tape bearing the original copy with the paper bearing the typed copy.

FIG. 2 shows the details of a one-two dimension converter control circuit. The typewriter makes an original written copy of information items which may be alphanumerical characters written on a first media which may be a sheet of typing. Obviously, such a sheet of paper has a two-dimension address for each information item written thereon. The perforating machine 23 makes a duplication of the written copy by forming symbols representing the information items on a second media (such as the original recorder tape 13). Each of these symbols has a one-dimension address and corresponds to one of the information items. The remainder of FIG. 2 forms a circuit for converting between the one and two dimension addresses. For this purpose, a tape transport mechanism 19 operates responsive to the converting means for orienting the tape so that the position of a particular symbol on the tape is coordinated with the position of the information item on the sheet of typing paper represented by that symbol.

In greater detail, FIGURE 2 is divided by dot-dashed lines to show the typewriter of FIG. 1, a counter-register at 18, and the tape transport mechanism at 19.

The counter-register, comparator, etc., are devices which are well known to those skilled in the electronic arts. For a textbook treatment of these arts, reference may be made to the books "Logical Design of Digital Computers," by Montgomery Phister, Jr. (1958), and "Understanding Digital Computers," by Paul Siegel (1961), both published by John Wiley and Sons, Inc. Specifically, Siegel gives an elementary discussion (with drawings) of these circuits on pages 141–149. Registers and counters may be arranged as shown in the following U.S. Patents 3,263,625, (FIG. 25), 3,177,291 (FIG. 4), and 2,656,460. A comparator appears in FIG. 3 of U.S. Patent 3,118,974. Those skilled in the art know how to set, preset, and stop counters; one example of how to do this appears in FIG. 62*c* of Siegel's book. Many companies now manufacture these logic circuits in integrated circuit form so that an entire counter may be bought as a single component and merely wired into place. The stepping motor is another commercial product, such as that sold under the trademark "Slo-Syn."

It should be understood that the tape transport 19 may be either part of the typewriter or a separate jig located at any convenient position near the typewriter. It is here assumed that the type on transport 19 is the same as tape 13 on the typewriter—here shown separately solely to facilitate a description of this part of the invention.

The typewriter is provided with a carriage position sensor 20 and with a platen position sensor 21. The carriage has an integrally attached set of finger spring contacts 22 positioned to make electrical contact with conductive segments on a printed circuit card that is attached to a stationary part of the typewriter either beneath or behind the carriage. Preferably, the printed circuit card has two rows of contact material 23, 24 for counting tens and units digits, respectively. Thus, for the first ten spaces along the carriage travel, a "tens" finger spring 22*a* touches the first tens segment 23*a* etc. The "units" finger spring 22*b* touches the contact segments in row 24 which the units number of the space identifications for carriage travel. For example, if the "tens" spring 22*a* touches the second "tens" segment 23*b* in row 23 and if the "units" spring 22*b* touches a fifth "units" segment 24*b* in row 24, the carriage is twenty-five character spaces from the extreme left-hand end position of carriage travel. This way, there is a direct read out of the carriage position regardless of how the carriage may have moved or stepped to reach that position. If the carriage is longer than a hundred character spaces, the counting will be done on a base other than ten. Of course, binary or other counting techniques may also be used.

The line sensor 21 is here shown as an indexing plate or code wheel on a printed circuit board having two concentric circles of conductive segments radially disposed thereon. One circle 25 of these conductive segments is coded to give a read out of "thousands" digits. The other circle 26 is coded to give a read out of "hundreds" digits. Again, binary or other digits may also be used.

The finger spring contacts 27, which touch the printed card 21, are geared at 28 to rotate with the platen and to move in a manner which correspond to the motion of the hands of a clock. The gearing 28 causes the finger springs 27 to sweep from a home (twelve o'clock) position to a home (twelve o'clock) position when the platen has turned far enough to feed through the typewriter the longest sheet of paper which a typist might reasonably be expected to use.

When a sheet of paper is first placed in the typewriter, its corners or other index points are aligned with a pair of targets 29, 30. Then, the finger spring contacts 27 are driven to their home or twelve o'clock position. Conveniently, this is done by pushing in a knob K at the end of the platen. After the knob K is pushed in, the finger springs 27 always turn and touch a pair of conductive segments on card 21—finger spring 27*a* identifies a line on the paper by a thousands digit; finger springs 27*b* by a hundreds digit. Thus, regardless of whether the platen is turned clockwise or counter-clockwise, the finger springs 27 always identify a line of type.

The counter-register 18 is shown with thousands, hundreds, tens and units storage capacity 34–31 to match the read out at finger spring contacts 22, 27. Well known ring counters may be provided for each of these units 31–34. The individual stages in these counter-register circuits 18 are connected to one side of a comparator circuit 35 of a conventional design, and the individual conductive segments on the printed circuit cards 20, 21 are connected via individual wires in cables 36, 37, 38, 39 to the other side of the comparator. The numerical identification corresponding to line spaces are, therefore, stored in the thousands and hundreds counters, 34, 33, and of carriage spaces are stored in the tens and units counters 31, 32.

Means are provided for comparing the signal from the platen sensor and the counter for detecting a coincidence or non-coincidence between the two sources of signals. In greater detail, the typewriter and counter-register 18 are thus arranged so that the comparator 35 gives a reading at 40 if there is a difference between the carriage or platen position and the electrical count stored at 18. If the count is high or low compared to the carriage position, the comparator 35 read out is negative or positive respectively. The principle is to maintain a parity between the one dimensional count stored in the counter-register 18 and a two-dimensional location of a spot where the type bar will strike the typing paper—regardless of how the typewriter is operated to move the paper. Stated another way, the tape moves as a slave of the typewriter so that a symbol on the tape always stands in a position which is coordinated with a corresponding information item on the sheet of typing paper.

Every place on a piece of paper, therefore, has a two-dimension line and space address. At any given instant, the address of the spot where the type bar will strike the paper is indicated by the potentials applied via the finger spring contacts 22, 27 to the comparator 35. Every space on the tape is identified by a one-dimension address, which is the number of steps taken by the tape after the zero operation when the knob K is pushed in. If the number of steps stored in the register-counter 18 corresponds with the two-dimensional address on the paper, the tape and paper are in registry and the comparator 35 does not give a reading.

A source—which may be a free running multivibration—of either positive or negative pulses 45 is adapted to simultaneously drive a tape stepping motor 46 and the counter-register 18. Thus, the counter-register 18 adds a count every time that the tape takes a step forward responsive to a positive pulse from driver 45 and subtracts a count every time that the tape takes a step backward responsive to a negative pulse from driver 45. The polarity of the driver pulses depends upon the polarity of the comparator output as read out at 40.

Preferably, the motor 46 drives a sprocket wheel 47 so that each step is taken as a function of linear tape motion. This way, the length of the linear steps does not change as a function of the amount of tape on the reels.

The counter-register 18 is arranged so that the units counter 31 is driven one step by each pulse from the pulse source 45. Every time the units counter 31 reaches a capacity count, a carry pulse is sent over conductor 48 to step the tens counter 32. Likewise, a carry pulse is sent over the conductor 49 to step the hundreds counter 33 every time that the tens counter 32 reaches capacity, and the conductor 50 to step the thousands counter 34 when the hundreds counter 33 reaches capacity.

The principle is that during typing, the mechanical position indicators 20, 21 are the master, and the electrical counter-register 18 is a slave. Every time that the typewriter advances a step during normal typing, the tape and counter-register 18 also advance a step. If the typist manually moves the typing paper in the typewriter by either rolling the platen or moving the carriage, the comparator 35 gives a signal at 40 to the driver 45. If the counter in the counter-register 18 is greater than that indicated by the position indicators 20, 21, the signal at output 40 is one polarity, and the tape backs up while the counter subtracts. If the count stored at 18 is less, the signal at output 40 is of opposite polarity and the tape advances while the counter adds. When the stored count corresponds to the position of the typing paper, the comparator 35 gives no signals, and the tape stops.

The typist observes the character printed on the tape beneath a hair-line 17 on the transparent plates 16 and compares it with the typing at the point on the page where the type bar strikes. If she notices a difference, she may turn the tape reel to bring the proper character under hair-line 17 and make the two readings the same. The arrangement is such that the manual movement of the tape is accomplished without changing the count in the counter-register 18.

The keyboard is interlocked with the tape drive responsive to the comparator output. Thus, the keyboard is locked and it is impossible to type if the carriage or platen are out of position with respect to the tape. If the tape is moved backward to a position where perforations are detected on tape 13 indicating that data is already stored on the original record tape 13, the keyboard remains locked until a correction key 55 (FIG. 1) and an identification key 56 are struck.

Means are provided for shifting the tape perforator from one tape to another. In greater detail, the key 55 transfers the perforator and printer in device 23 to record symbols on the tape 14, when the typewriter is operated. Key 55 stays down (and may light) after it is struck so that the typist can see that she has transferred to the correction tape 14. After the two keys 55, 56 are struck, the keyboard interlock releases to allow the typist to type in a normal manner and perforate-print on the correction tape 14.

A suitable record of transfer symbol is printed on both the original and correction tapes 13, 14. The symbol 57 FIG. 4) is printed on the tape when the correction key 55 is struck. This symbol is a positive command to the tape reader which responds by shifting up to the correction tape 14. There is no corresponding transfer symbol 57 on tape 14, thus indicating that symbols on the tape 13 are the master on this transfer up. As shown at 58, FIG. 4, the identification symbol printed when the key 56 is struck, could be a binary coded digit printed on the tape in magnetic or colored ink. Preferably, this symbol is printed on the underside of the tape to avoid confusion with the message already printed on the upper side of the tape and to facilitate the use of an optical reading head, such as a photo-electric cell. However, any suitable arrangement may be used. The nature of the symbol is unimportant as long as the identification symbol printed on both the original record tape 13 and the correction tape 14 provide a positive coordination of the tape positions. As here shown, on transfer up to the correction tape, the two symbols 58 are printed at the same time. On transfer down, the typist must print the two symbols by separately striking two keys.

As long as the readers on the two tapes find the same identification symbols, the tape positions will be coordinated. A plurality of different identification symbols are provided by the plurality of keys 56 so that there will be a separate symbol for every correction that might reasonably be expected to be made within a reasonable space on a single sheet of paper. Ideally, the typist should use these symbols in a numerical, alphabetical, or other pre-established order for identifying the successive tape transfers; however, if she uses the identification symbols at random, it will make no difference as long as the tape transfer device finds the same symbols identifying the same transfer on both the correction and original tapes. Preferably, the last identification key 56 that was struck will be arranged to light or otherwise identify itself as a memory aid for the typist. Also, a special caret 59

(FIG. 7) with the identification symbol may be printed on the typing paper so that the typist can see where the corrections will be made. Later, during a read out, the tape reader (not shown) will switch from the original record tape 13 to the correction tape 14 when the shift up transfer symbol 57 is detected, and back to the original tape when the shift down symbol 61 is detected. On transfer, the typewriter will be locked until the same identification symbol 58 is found under each tape reader.

Figure 4:
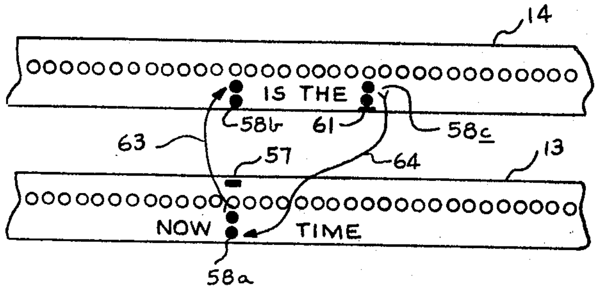
FIG. 4 shows a pair of torn tape sections for explaining how insertions are made without substitution.

In the example of FIG. 4, the clean copy collated tape correction would be an insertion of the two complete words "is the" between the words "now" and "time" so that the clean copy collated type reads "Now is the time."

The typist will see the corrections while they are being made. The place where she actually types the corrections is not important. Most likely, she will elect to type the inserted correction material on the paper tape that is pulled off the lower deck 12*b* of the spool in FIG. 1. To do this, it is only necessary to swing or throw the lever 15 which raises a ribbon guide 15*a* to place the paper tape behind the ink ribbon at the point where the type bars will strike it. Then she will see the corrected copy as it is typed on the paper ribbon.

Alternatively, she may elect to pull knob 59 and thereby disengage the platen ratchet (not shown) by lifting a pawl (also not shown) in the well known manner. The ratchet will, however, retain its position relative to the platen so that the typing will be aligned when the platen is returned to its original position. If the knob 59 is pulled, it also opens the wires in cables 36, 37, 38, 39 to prevent the counter-register 18 from changing its counts. (The finger spring contacts 27 do not home when knob 59 is pulled as it does when knob K is pulled.) Thereafter, she may move the carriage and platen to type the correction in a margin, between the lines, or at any other place on the sheet of typing paper. When the correction is completed, the typist returns the carriage and platen to the original position where it rested before she moved it. Then, she pushes in the knob 59 to allow the pawl to re-engage the platen ratchet and reclose the wires in the cables 36, 37, 38, 39. The platen ratchet will have remembered the original mechanical position, and this will help the typist to align the line of type.

After the correction is completed and the symbols of the corrected message have been formed on the correction tape 14, an end of correction key 60 is struck to print a transfer back to the original record tape symbol 61. The fact that symbol 61 appears on tape 14 and not on tape 13 indicates that tape 14 is the master and tape 13 is the slave on transfer back. The key 55 raises and the key 60 stays down (and may light) as a visual aid to the typist so that she will know that she is perforating and printing on the original record tape 13. During read out, the tape reader will automatically shift down from the correction tape 14 to the original tape 13 when the symbol 61 is read.

While the correction is being typed on the correction tape 14, the original record tape 13 stands still and the count in counter-register 18 does not change. Later, when the tape 13 is read out or played back, the same thing occurs. Thus, during read out, the identification symbol 58*a* which was printed on the original tape 13 when the reader switched to the correction tape, is still under a reading head when the reader is transferred back to the original record tape. If the typist strikes the same identification symbol key 56 for transfer back to the original which she struck for transfer to the correction tape, the original symbol 58*a* that is still standing under the reader head for the original tape corresponds to the identification symbol 58*c* that accompanies the transfer back symbol 61. Therefore, the transfer of readers is indicated by arrows 63, 64, and the correction will be interpreted as an insertion between the characters "W" and "T" in the original record without any deletions (FIG. 4).

On the other hand, if the typist wishes to make a deletion (FIG. 5) she will follow the procedure described in connection with FIG. 4. This time, however, she will move the carriage after striking the end of correction key 60, to the point where the deletion ends. Because the tape reader has transferred back to tape 13, the original record tape 13 follows the carriage as it moves. At the end of the deletion, she will not print the same identification symbol 58 that she printed at the point where the deletion begins. Instead, she will strike another identification symbol key 56 and print another transfer symbol 65*a* which is the same as the symbol 65*b* which she struck on tape 13 at the end of the correction, This time, during read out, the original tape reader is standing over the symbol 58 when the transfer back occurs. Thus, it does not find an identity or correspondence between the end of the correction symbol 65*b* on the correction tape 14 and the symbol 58 standing under the reader head for the original tape 13. Therefore, during read out, the original tape 13 advances until its associated reader finds the end of the correction symbol 65*a* which is the same as the symbol 65*b* printed at the end of the correction on tape 14. The material printed on the tape 13 between the original transfer symbol 58 and the end of correction symbol 65*b* is deleted. For example, in FIG. 5, the material "XS TWE TM" is deleted and the material "is the time" will be substituted therefor.

This is all that is required; however, it is recognized that some typists may become confused as to the results of the described procedure. Therefore, a special deletion key 66 (FIG. 1) is provided to strike over the copy on the original record tape 13 which is to be deleted. As the typist crosses out the deleted material, she can see what she is doing and will later know that the deletion has been made. Simultaneously. the original record tape 13 may be punched with a hole in every position as a deletion symbol. The tape 13 takes one step each time that key 66 is struck.

Figure 5:
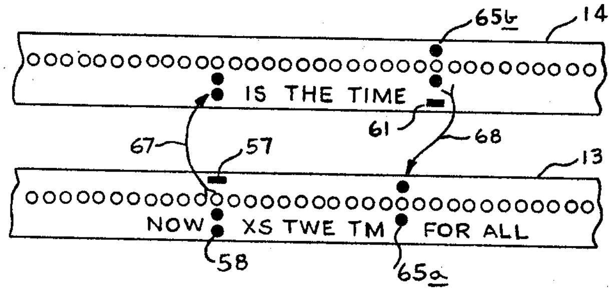
FIG. 5 shows a pair of torn tape sections for explaining how a correction may be substituted for an original record.

Thus, in the example of FIG. 5, the tape readers effectively move back and forth as indicated by the arrows 67, 68.

Figure 6:
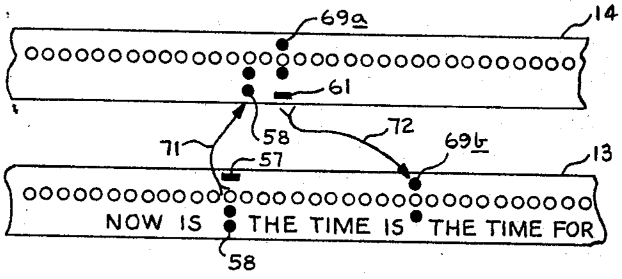
FIG. 6 shows a pair of torn tape sections for explaining how a deletion is made without correction.

FIG. 6 illustrates how the typist makes a deletion without substituting any printed information therefor. More particularly, at the point where the deletion begins, the typist strikes the transfer up key 55 and the identification key which causes the symbol 58 to be printed on both tapes 13, 14. There is no correction to be inserted on tape 14, so she strikes the transfer back key 60 and another identification symbol 69*a*. Then, she advances the original tape 13 to the point where the deletion ends. There she prints the same identification symbol 69*b* that was last printed on the correction tape 14. During read out, the transfer back symbol 61 finds the tape readers reading different symbols at 58, and 69*a*. The tape 13 reader then advances the tape 13 and hunts for a symbol 69*b* which is the same as identification symbol 69*a*. When a correspondence is found, the tape 13 is again read. Thus, the tape readers switch back and forth as indicated by the arrows 71, 72 and the words "the time is" is deleted between the symbols 58 and 69*b*.

In FIG. 1, the ends of tapes 13, 14 are shown as going to a "tape collator." The nature and location of this device is immaterial; however, its output will be a single, collated "clean copy" tape of the original copy tape 13 as amended by the corrections on the tape 14. If the new "clean copy" tape is run through a read out typewriter, a freshly typed copy results, FIG. 7.

Figure 7:
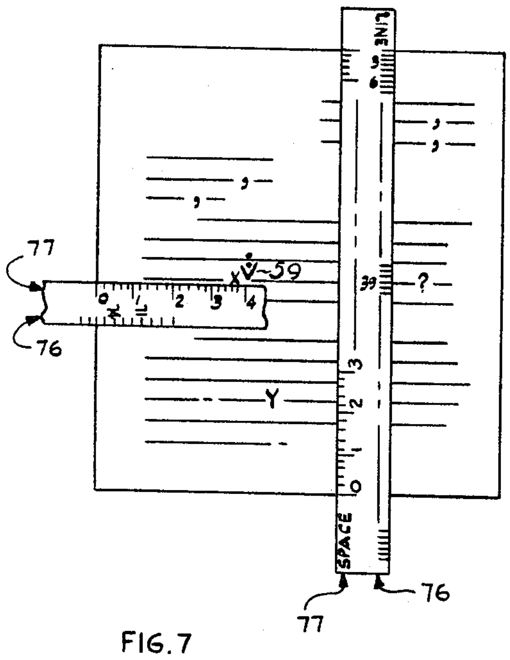
FIG. 7 shows how to manually relate a position on a two-dimension sheet of typed copy with a position on a one-dimension perforated tape.

Means are provided for correcting the clean copy collated tape after the typewriter paper has been removed from the typewriter, and perhaps after the collated tape has also been removed from the transport mechanism 19 (FIG. 2). The typist will have available to her a ruler with two scales 77, 76, as shown in FIG. 7. One scale 76 measures the paper vertically in terms of single space line units with respect to the zero set when knob K is pushed in, e.g. if the zero set was relative to the top of the page, the ruler 76 also measures from the top of the page. The read out from this scale 76 identifies a line in terms of a thousands and a hundreds digit. The other scale 77 measures the paper horizontally in terms of character spaces. The read out from this scale identifies a character space in terms of a tens and a units digits with respect to the edge of the paper. If the typist followed the correct procedures, the edge of the paper coincides with the zero point on the scale 24 (FIG. 1). For example, suppose that the letter "X" (FIG. 7) is a mistake. The address read from the scale 76 is "3900." The address read from the scale 77 is "38." Hence, the address of the letter "X" is "3938."

The collated tape is put on its transport mechanism 19 at the start position corresponding to the zero set when the knob K was pushed in at the start of typing.

After taking the address reading "3938," the typist operates the counter preset circuit 80 to mark stages in the counter-register circuits 34, 33, 32, 31 respectively. Then, acting over conductor 81, counter preset circuit 80 commands the driver circuit 45 to pulse the tape stepping motor 46 and the counter-register 18, as described above. This drives the tape and the counter-register 18, a step at a time in synchronism.

When the counter-register 18 reaches the count which was premarked when the address "3938" was keyed, circuit 80 provides a stop signal. Then it removes the signal from the wire 81, and driver 45 stops pulsing out.

The tape has now taken the number of steps which were keyed into the circuit 80 (3938 steps for the cited example). Therefore, through the transparent plate 16, the typist should see the letter "X" under hairline 17. If the typist accurately read the address from scales 76, 77 and made no mistakes, the letter "X" is standing under the hairline 17. If not, she may turn the tape reels on transparent mechanism 19 until the letter "X" does appear under the hairline 17. Then, she performs the functions described above, and following the procedure described in conjunction with FIGS. 4–6; this makes the necessary corrections on a new tape 14. Thereafter, the collated tape on transport mechanism 19 is re-collated with the new correction tape.

While the principles of the invention have been described in connection with specific apparatus, it is to be clearly understood that this description is made only by way of example and not as a limitation on the scope of the invention.

We claim:

1. A one-two dimensional converter control circuit comprising means for making an original written copy of information items by writing said items on a first media having two dimension addresses for each of said items, means for making a duplication of said written copy by forming symbols representing said items on a second media having one dimension addresses for each of said items, means for generating electrical signals representative of said two-dimension and one-dimension addresses, means for comparing said signals for detecting a non-coincidence between said one and said two dimension addresses, and positioning means operated responsive to a detection of said non-coincidence for orienting said first and second media so that the position of a particular item of information is coordinated with the position of the symbol representing said particular item.

2. The converter circuit of claim 1 wherein said means for making said original copy comprises a typewriter having a carriage and a platen, said first media comprises at least one sheet of typing paper, and said two dimensional addresses comprises line and space indications, said second media comprises at least one tape, said means for making said duplication comprises means for storing said symbols on said tape, said one dimensional addresses comprises a number of character steps taken along the length of said tape; and said positioning means comprises means responsive to motion of said carriage and said platen for driving said tape as a slave of the typewriter.

3. The converter circuit of claim 2 in which there are two of said tapes, means responsive to the typing of said original written copy for making an original record of said copy on a first of said tapes, means responsive to a manipulation of said typewriter for shifting the record making means from said first tape to the second tape, whereby corrections may be made on said second tape, means responsive to further manipulation of said typewriter for shifting the record making means back to said first tape for continuing said original record, and means for collating said two tapes to provide a single clean copy tape of said original record as amended by said corrections.

4. The converter circuit of claim 1 wherein said means for making said original copy comprises a typewriter having type face means for normally typing on paper in said typewriter and a double deck spool having two independently movable ribbons thereon, means responsive to operation of said typewriter for selectively turning either or both of said spools, means comprising one of said decks for transporting a typewriter ribbon by the type face means so that said typewriter makes a printed record by striking said type face against the ribbon which in turn strikes against the paper, means comprising the other of said decks for independently transporting a paper ribbon by the type face means, and means for selectively raising said paper ribbon to a position where it is struck by said type face to make a record of corrections made in said original copy without overstriking said paper in said typewriter.

5. The converter circuit of claim 4 and means effective when said paper ribbon is not raised for holding said other deck motionless while said one deck transports said typewriter ribbon.

6. The converter circuit of claim 1 and means for printing alphanumerical characters on said one dimension media, means for exposing the characters on said one dimension media which correspond to a line of type on said first media, and index means for identifying the character on the one dimension media corresponding to an information item on said first media in a position such that said item could be written on said first media.

7. The converter of claim 1 wherein said means for making said original copy comprises a typewriter having carriage and platen sensors associated therewith to read out an electrical signal indicating the position of a sheet of paper in said typewriter in terms of said two dimension address, said second means comprises at least one reel of tape, electrical means for continuously storing the number of steps taken by said tape since the start of the typing on said sheet of paper, comparator means for detecting differences between said sensor signals and said stored numbers, and means responsive to said comparator for simultaneously stepping said storage means and said tape until said sensors signals and stored numbers correspond to each other.

8. The converter of claim 7 and means responsive to said comparator for locking said keyboard to prevent typing while said tape and said carriage are out of position with respect to each other.

9. The converter of claim 1 wherein said second media comprises two reels of tape, means for stepping one of said reels and forming said symbols on the tape drawn from said one reel simultaneously with the writing of said information items, means for applying a transfer symbol on the tape of at least said one reel and thereafter stepping the other of said reels and forming said symbols simultaneously with the writing of said information items, means for applying another of said transfer symbols on the tape of at least the other of said reels and thereafter stepping said one reel and forming said symbols simultaneously with the writing of said information items.

10. The converter of claim 9 wherein there are a family of said transfer symbols, and means selectively responsive to said transfer symbols coordinating the positions of said two reels of tape, said last named means comprising means for bringing said two tapes to positions where the same transfer symbol appears at the same relative position on the two tapes.

11. An automatic typewriter comprising first storage means for making a record of an original typed copy responsive to operation of said typewriter, said copy having interruption points occurring naturally therein, second storage means for making a record of editorial changes to be incorporated into said original copy at any character location in said original typed copy, means operative responsive to the making of said record of editorial changes for marking both said first and said second means to indicate a transfer function, said marking being applied to said first and second means independently of said interruption points, means responsive to said transfer markings for collating said first and second storage means to combine said original copy and said editorial changes to make a clean copy of the original, and means associated with said collating means for making said editorial changes in the text of said original copy, whereby said original copy may be modified by inserting, substituting, or deleting material at any character location in said original copy.

12. The typewriter of claim 11 and means associated with said collating means for making said changes by inserting text material into the text of said original copy while said clean copy is being made.

13. The typewriter of claim 11 and means associated with said collating means for making said changes by substituting a new passage of text for a passage of text in said original copy while said clean copy is being made.

14. The typewriter of claim 11 and means associated with said collating means for making said changes by deleting a passage of text in said original copy while said clean copy is being made.

15. The typewriter of claim 11 and means associated with said record making means for correlating the text of said editorial changes with the text of said original copy, and means responsive to said correlating means for operating said collating means to shift between the text of said original copy and said editorial change record as said clean copy is being made.

16. The typewriter of claim 15 wherein said correlating means comprises means for selectively making one of a family of transfer symbols appear in said original text and said editorial change text, and means for causing said shifting means to operate by establishing a predetermined correlation of the transfer symbols in the text material of the original copy with the transfer symbols in the text material of said editorial changes.

17. The typewriter of claim 16 and means whereby certain of said transfer symbols comprises a family of symbols indicating a transfer from the original copy to the editorial change record, and other of said transfer symbols comprises a family of transfer symbols indicating a transfer from the editorial change text to the original copy.

18. The automatic typewriter of claim 11 and means for operating said editorial change record means after said original copy has been removed from said typewriter.

19. The automatic typewriter of claim 11 and means for making said record of said editorial changes after the original copy has been removed from said typewriter.

20. The automatic typewriter of claim 11 and means for making said record of said editorial changes while said original copy is still in said typewriter.

21. The typewriter of claim 11 and means independent of the paper on which said original copy is printed for receiving the impression of the text which is printed when said editorial changes are made.

22. The typewriter of claim 11 and means for typing said editorial changes between the lines or in the margin of said original copy.

23. The typewriter of claim 11 and means for typing a special caret on the original copy so that the typist can see where the editorial changes will appear in said clean copy.

24. The typewriter of claim 11 and means for interlocking the keyboard of said typewriter whenever the typist has failed to follow the prescribed procedures or the typewriter is not ready to receive either the editorial changes or a continuation of said original copy.

25. The typewriter of claim 11 and means for indicating to the typist using the typewriter whether said typewriter is in the mode for making the original copy or the mode for making the editorial changes record.

26. The typewriter of claim 11 and means comprising at least one data storage tape for making a record of said original copy and said editorial changes as they are made, and means whereby said typist may over strike said tape so that she may see where the changes are actually being made on the tape.

27. The typewriter of claim 11 and a paper tape, spool, and transport mechanism for receiving the printed impression made by said typewriter when said editorial changes are typed.

References Cited

UNITED STATES PATENTS

| | | | |
|---|---|---|---|
| 2,646,155 | 7/1953 | Cardon | 197—20 |
| 2,788,886 | 4/1957 | Paulding et al. | 197—20 X |
| 2,800,539 | 7/1957 | Edminster et al. | 197—20 |
| 2,811,235 | 10/1957 | Geissler | 197—1 |
| 2,905,299 | 9/1959 | Hildebrandt | 197—20 |
| 2,954,860 | 10/1960 | Woodhead | 197—20 X |
| 2,968,383 | 1/1961 | Higonnet et al. | 197—20 |
| 3,120,301 | 2/1964 | Lorch | 197—20 |
| 3,260,340 | 7/1966 | Locklar et al. | 197—20 X |
| 3,260,341 | 7/1966 | Braunig et al. | 197—20 X |
| 3,283,871 | 11/1966 | Becking et al. | 197—20 |

ROBERT E. PULFREY, *Primary Examiner.*

E. S. BURR, *Examiner.*